(12) United States Patent
Lenk

(10) Patent No.: US 12,241,812 B2
(45) Date of Patent: Mar. 4, 2025

(54) SENSOR SYSTEM WITH A LEAKAGE DETECTOR

(71) Applicant: VEGA GRIESHABER KG, Wolfach (DE)

(72) Inventor: Fritz Lenk, Schiltach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 18/511,626

(22) Filed: Nov. 16, 2023

(65) Prior Publication Data

US 2024/0085264 A1 Mar. 14, 2024

Related U.S. Application Data

(63) Continuation of application No. 17/193,813, filed on Mar. 5, 2021, now Pat. No. 11,860,063.

(30) Foreign Application Priority Data

Mar. 6, 2020 (DE) ...................... 10 2020 202 925.3

(51) Int. Cl.
*G01M 3/22* (2006.01)
*G01M 3/28* (2006.01)

(52) U.S. Cl.
CPC .......... *G01M 3/223* (2013.01); *G01M 3/2853* (2013.01)

(58) Field of Classification Search
CPC ..... G01M 3/223; G01M 3/2853; G01M 3/183
See application file for complete search history.

(56) References Cited

U.S. PATENT DOCUMENTS

| 3,943,769 A * | 3/1976 | Irsai ...................... G01F 23/241 73/304 R |
| 5,265,464 A * | 11/1993 | Caron ................. G01M 13/005 73/37 |
| 6,408,697 B1 | 6/2002 | Ootake et al. |
| 7,962,254 B2 | 6/2011 | Bouchet et al. |
| 11,860,063 B2 * | 1/2024 | Lenk ..................... G01M 3/183 |
| 2018/0149549 A1 | 5/2018 | Gonzales |

FOREIGN PATENT DOCUMENTS

AT 412 231 B 11/2004
FR 2 783 303 A1 9/1998

OTHER PUBLICATIONS

German Office Action issued Oct. 15, 2020 in German Patent Application No. 10 2020 202 925.3, 6 pages.

* cited by examiner

*Primary Examiner* — David Z Huang
(74) *Attorney, Agent, or Firm* — Oblon, McClelland, Maier & Neustadt, L.L.P.

(57) ABSTRACT

The present disclosure relates to a sensor system for monitoring the sealing of the connection between a sensor holder and a sensor that is mounted on the sensor holder. The sensor system includes a sensor holder, a sensor that is mounted on the sensor holder, and a leakage detector with a channel, which is arranged in the sensor holder and consists of one or more straight sections that are mounted perpendicular or parallel to the longitudinal axis of the sensor.

13 Claims, 3 Drawing Sheets

SENSOR SYSTEM WITH A LEAKAGE DETECTOR

CROSS-REFERENCE TO RELATED APPLICATIONS

This application is a continuation of U.S. application Ser. No. 17/193,813, filed Mar. 5, 2021, which claims the benefit of the filing date of German Patent Application No. 10 2020 202 925.3 filed on 6 Mar. 2020, the entire contents of each of which is incorporated herein by reference.

FIELD

The disclosure relates to a sensor system for monitoring the sealing of the connection between a sensor holder and a sensor that is mounted on the sensor holder, and to the use of a sensor holder having a channel for monitoring the sealing of the connection between the sensor holder and a sensor that is mounted on the sensor holder.

BACKGROUND

A sensor, such as a fill level meter or a limit level meter, is often installed on a process plant for measuring or monitoring a process. Testing the sealing when attaching the sensor to a process container or a pipeline is particularly of importance for the application of the sensor in the hygiene sector, for example in the food or pharmaceutical industry. In particular, a cleanable design can be certified for approvals of a sensor according to a specifically required standard, 3-A (3-A Sanitary Standards Inc.) or EHEDG (European Hygienic Equipment Design Group), in the hygienic field.

SUMMARY

There may be a desire to provide an alternative and simplified sensor system, which allows verifying the reliability of the connection of the sensor to the process equipment.

According to an aspect of the disclosure, a sensor system for monitoring the sealing of a connection between a sensor holder for attaching a container or a piping system and a sensor that is mounted on a sensor apparatus is provided. The sensor system comprises the sensor holder, the sensor that is mounted on the sensor bracket, and a leakage detector. The leakage detector comprises a channel that is arranged in the sensor holder and consists of one or more straight sections, each of which is attached perpendicular and/or parallel to the longitudinal axis of the sensor.

The sensor holder may be designed as a rotating part of the sensor system and comprise a central axis that corresponds to the longitudinal axis of the sensor.

The one or more straight sections of the channel of the leakage detector may be designed to be in form of one or more bores.

Compared to a channel, in which a bore is mounted obliquely to the longitudinal axis of the sensor or the central axis of the sensor holder, the straight sections of the channel of the leakage detector or the bores, which are arranged in a direction parallel to the central axis of the sensor holder and/or perpendicular or at 90° to the central axis of the sensor holder, may be provided by means of a common lathe.

Alternatively, the leakage detector may comprise a channel having a straight portion, which is arranged perpendicular to the longitudinal axis of the sensor. Hence, a visual inspection at the connection between the sensor and the sensor holder may be carried out in a simple manner.

According to a first embodiment, the leakage detector comprises a plurality of straight conduit-like sections, which are arranged perpendicular to each other and connected to each other.

According to another embodiment, the sensor comprises an end, which is adapted to mount the sensor system. The leakage detector is arranged in the immediate vicinity of the end of the sensor and is configured to indicate a leakage of the connection between the sensor holder and the sensor.

According to another embodiment, the sensor system comprises a sealing element, which is arranged at the end of the sensor and configured to seal the connection between the sensor holder and the sensor.

Since, in the event of failure of the sealing element, the medium present in the container or in the pipe system upstream of the sealing element may leak out, the channel may be provided in the vicinity of the sealing element, in particular on the side facing away from the sealing element, in order to monitor and quickly indicate a leakage of the medium from the container or the pipe system.

Furthermore, the sensor system may comprise a plurality of sealing elements, which are arranged at the lower end of the sensor and configured to seal the connection between the sensor and the sensor holder.

For example, the leakage detector may comprise a first straight section, a second straight section, and/or a third straight section. For example, the first section is provided perpendicular to the longitudinal axis of the sensor and the second and third straight sections are provided parallel to the longitudinal axis of the sensor.

According to another embodiment, the leakage detector comprises a filter, which is visibly arranged in one of the straight sections of the channel, provided with a dye and configured to visualize the leakage.

For example, the filter may be provided at the end of the channel that is visible from the outside. Upon contact with the medium, which leaks out through the sealing element and enters into the channel, the filter may become discolored, thereby indicating the leakage of the connection between the sensor system and the sensor holder.

According to another embodiment, the sensor holder is designed as a flange, in order to be mounted to the container opening.

According to another embodiment, the sensor is a fill level meter, a limit level meter or a flow meter.

According to another embodiment, the sensor system further comprises a closure apparatus. The closure apparatus may be arranged at an open end of the channel and configured to close or seal the open end of the channel.

According to another embodiment, the closure apparatus is a grub screw, a closure cap, a lid or an insert disk.

Accordingly, the closure apparatus may be designed to match the diameter of the channel, providing a promising sealing effect and preventing a blind hole of the sensor system, e.g. for meeting the compliance requirements in food industry.

It may also be possible that the filter or the dye may be integrated in the closure apparatus.

According to another aspect of the present disclosure, a sensor holder having a channel is used, the sensor holder being arranged in the sensor holder and consisting of one or more straight sections that are mounted perpendicular and/or parallel to a longitudinal axis of a sensor for monitoring the sealing of the connection between the sensor holder and the sensor that is mounted on the sensor holder.

In the following, further embodiments of the present disclosure will be described with reference to the figures. Where identical reference signs are used in the following description of figures, they denote identical or similar elements. The representations in the figures are schematic and not to scale.

DETAILED DESCRIPTION OF EMBODIMENTS

Figure 1:
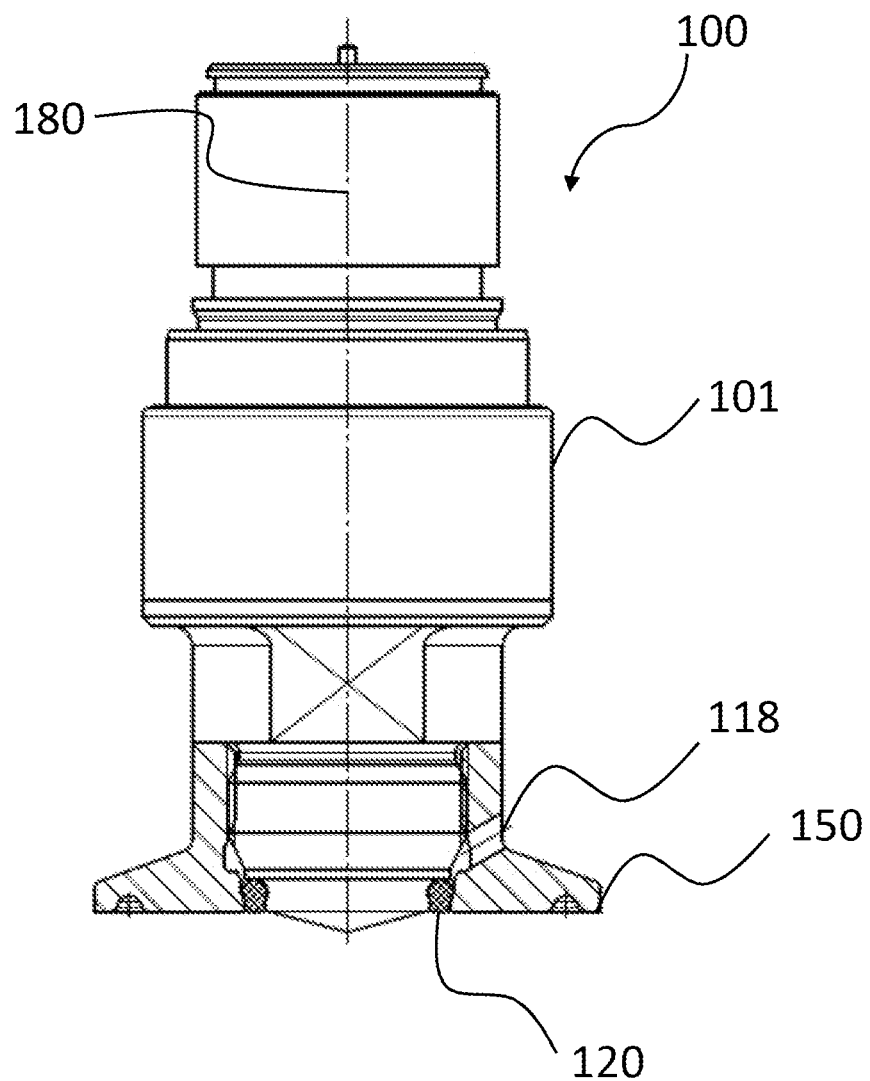
FIG. 1 shows a schematic a sensor system.

FIG. 1 shows schematically a sensor system 100. The sensor system 100 comprises a sensor holder 150 and a sensor 101 that is attached or mounted to the sensor holder 150. Furthermore, the sensor system 100 comprises a sealing element 120 that is arranged at the lower end of the sensor system or sensor holder 150 and configured to seal the connection of the sensor system 100 to the sensor holder 150.

The sensor comprises a longitudinal axis 180, as shown in FIG. 1.

The sensor holder 150 of the sensor system comprises a channel 118, which is designed to be in form of a bore and is arranged obliquely with respect to the longitudinal axis 180 of the sensor 101 in the vicinity of the sealing element 120. The channel 118 is configured to monitor or indicate a leakage of a medium that may leak out through the sealing element 120.

Figure 2:
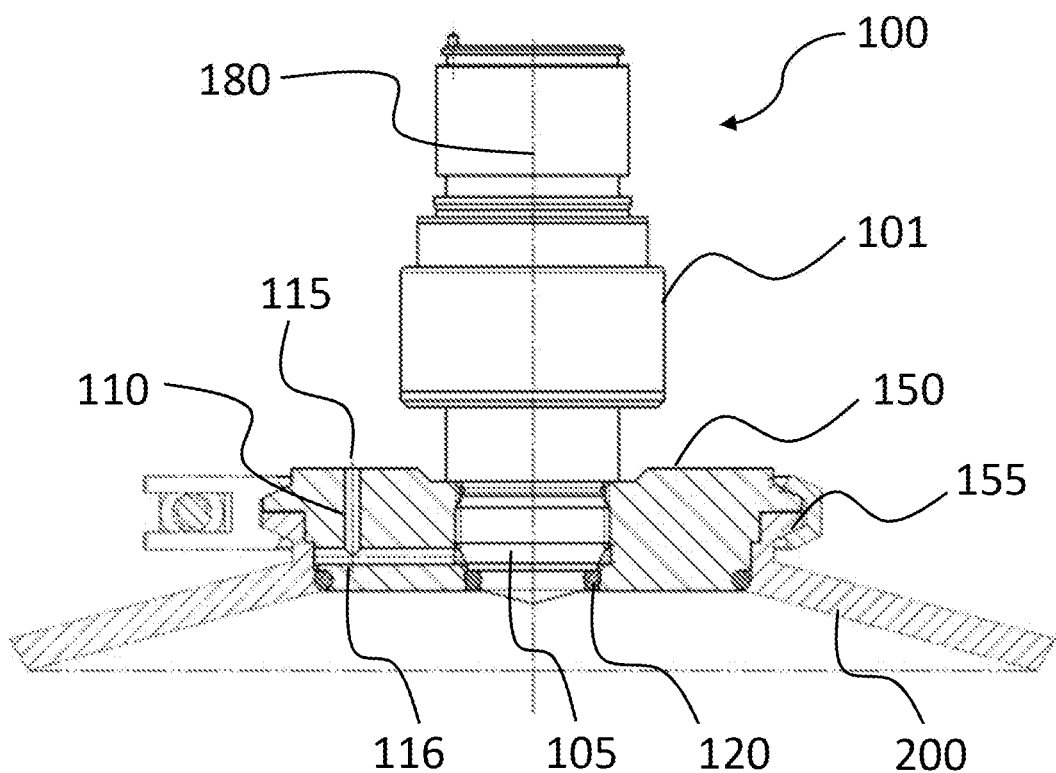
FIG. 2 shows schematically a sensor system for monitoring the sealing of the connection between a container and a sensor according to an embodiment.

FIG. 2 shows a sensor system 100 according to one embodiment for monitoring the sealing of a connection between a sensor holder 150 for the attachment to a container 200 or a piping system and a sensor 101 mounted on the sensor holder 150.

The sensor system 100 in FIG. 2 comprises a sensor holder 150, a sensor 101 that is mounted to the sensor holder 150, and a leakage detector 110. The leakage detector 110 comprises a channel 115, 116 which is arranged in the sensor holder 150 and consists of one or more straight sections, for example, a first straight section 115 and a second straight section 116. The sensor holder 150 is designed as a flange and is attached to the opening 155 of a container 200 by means of a flanged connection.

The sensor 101 comprises a longitudinal axis 180. The sensor holder 150 comprises a central axis that corresponds to the longitudinal axis 180 of the sensor.

Compared to the channel 118 in FIG. 1, which is arranged obliquely with respect to the longitudinal axis 180 of the sensor 101 and the central axis of the sensor holder 150, the first and second straight sections 115, 116 of the leakage detector 110 are respectively arranged perpendicular or parallel to the longitudinal axis 180 of the sensor 101. The first straight section 115 and/or the second straight section 116 are arranged perpendicular to each other and connected to each other.

Figure 3:
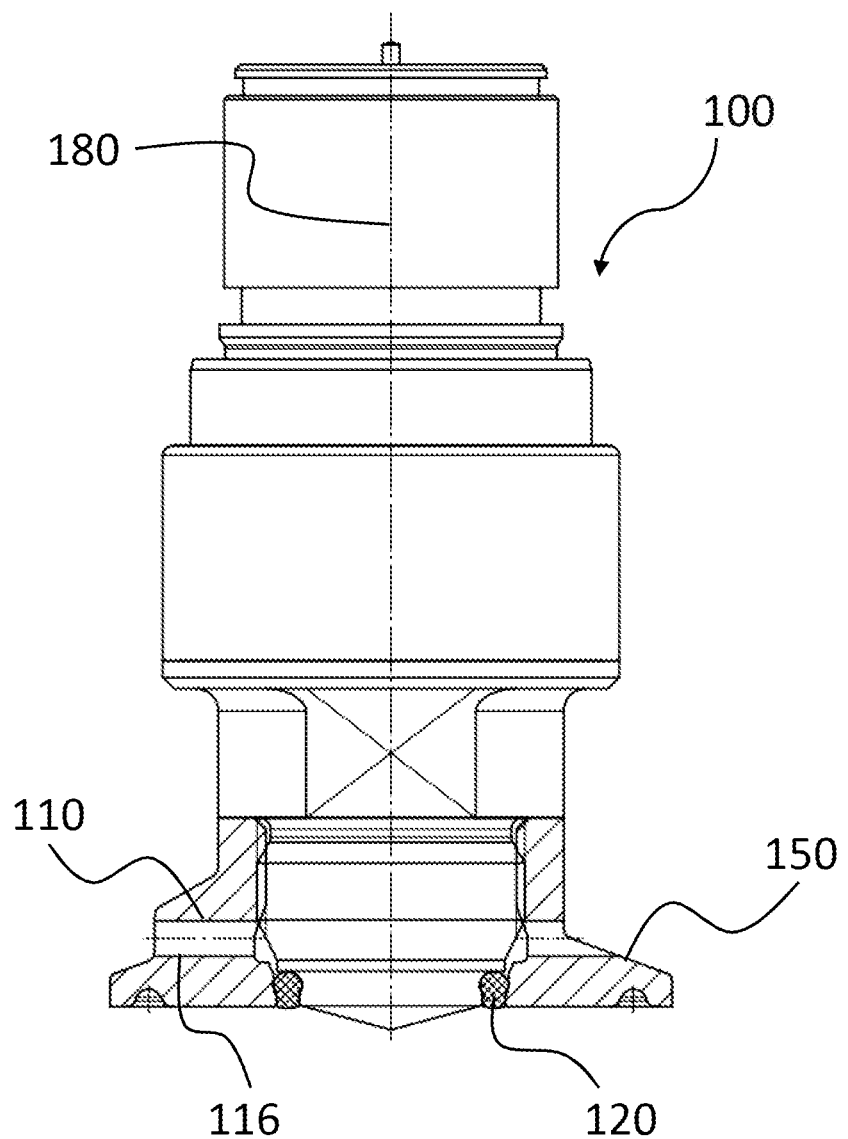
FIG. 3 shows schematically a sensor system according to an embodiment.

For example, FIG. 3 shows that the leakage detector 110 comprises a channel with a straight section 116 that is arranged perpendicular to the longitudinal axis 180 of the sensor 101. A visual inspection at the connection between the sensor 101 and the sensor holder 150 can thus be carried out without much effort.

The straight sections 115, 116 of the channel 110 in FIG. 2 and FIG. 3 may be designed to be in form of bores.

An advantage of the arrangement of the channel in the sensor holder 150 in FIG. 2 and FIG. 3 over the oblique arrangement of the channel in FIG. 1 is that the straight sections 115, 116 in FIG. 2 and FIG. 3, which are perpendicular and/or parallel to the longitudinal axis 180, may be manufactured using a common lathe without much effort. Thus, the overall fabrication process of the sensor system 100 may be simplified.

The sensor system may further comprise a closure apparatus, which may be a grub screw, a closure cap, a lid or an insert disk. The closure apparatus may be arranged at an open end of the channel and configured to close or seal the open end of the channel 115, 116, providing a promising sealing effect and preventing a blind hole of the sensor system, e.g. for meeting the compliance requirements in food industry.

Furthermore, the sensor system 100 comprises a lower end 105, which is configured to mount the sensor system 100 to the opening 155 of the container 200, and a sealing member 120, which is provided at the end 105 of the sensor and configured to seal the connection between the sensor holder 150 and the sensor 101.

In the case, where a plurality of sealing members are provided in the sensor holder 150, the channel may comprise a third straight section, which is arranged perpendicular to the first straight section 115 and parallel to the central axis of the sensor holder at a distance parallel to the second section 116 and connected to the first straight section 115. Since the first section 115 is configured as a common section for connecting to the second and third sections, the number of horizontal sections may be reduced.

The leakage detector 110 or the first section 115 of the channel is arranged in the immediate vicinity of the end 105 of the sensor 101 and/or in the vicinity of the sealing element 120 on the side facing away from the sealing element 120. In the event of a failure of the sealing element 120, the medium contained in the container 200 may leak from the container and spread along the first and second sections 115, 116 of the channel 110 to an open, unpressurized end of the channel, which is visible from the outside.

Furthermore, a filter may be provided at the open end of the channel. The filter is designed in such a way that the filter changes color when coming into contact with the leaking medium, in order to indicate the leakage and thereby monitor the sealing.

Additionally, it should be noted that "comprising" or "having" does not exclude other elements and "a" or "an" does not exclude a plurality. It should further be noted that features that have been described with reference to any of the above embodiments may also be used in combination with other features of other above-described embodiments. Reference numerals in the claims should not be interpreted as limiting.

The invention claimed is:

1. A sensor system for monitoring a sealing of a connection, comprising:
    a sensor holder;
    a sensor mounted on the sensor holder;
    a closure apparatus; and
    a leakage detector including a channel that is arranged in the sensor holder, wherein the channel consists of one or more straight sections arranged perpendicular and/or parallel to a longitudinal axis of the sensor,
    wherein the connection is between the sensor holder and the sensor mounted on the sensor holder, wherein the leakage detector is designed to visualize a leakage of the sensor system by visual inspection at the channel, wherein the closure apparatus is a grub screw, and wherein the closure apparatus is arranged at an open end of the channel and configured to match the diameter of the channel, to close or seal the channel, and to prevent a blind hole of the sensor system for meeting compliance requirements in food industry.

2. The sensor system according to claim 1, wherein the leakage detector further includes a plurality of straight sections arranged perpendicular to each other and connected to each other.

3. The sensor system according to claim 1, wherein the sensor has an end that is configured to permit mounting of the sensor system; and wherein the leakage detector is arranged adjacent to an end of the sensor and is configured to indicate a leakage of the connection between the sensor holder and the sensor.

4. The sensor system according to claim 2, wherein the sensor has an end that is configured to permit mounting of the sensor system; and wherein the leakage detector is arranged adjacent to an end of the sensor and is configured to indicate a leakage of the connection between the sensor holder and the sensor.

5. The sensor system according to claim 3, further comprising:

a sealing element that is arranged at the end of the sensor and configured to seal the connection between the sensor holder and the sensor when the sensor is mounted.

6. The sensor system according to claim 1, wherein the sensor holder is designed as a flange.

7. The sensor system according to claim 1, wherein the sensor is a fill level sensor, a limit level sensor, or a flow sensor.

8. The sensor system according to claim 2, wherein the sensor holder is designed as a flange.

9. The sensor system according to claim 2, wherein the sensor is a fill level sensor, a limit level sensor, or a flow sensor.

10. A leakage detector for monitoring a sealing of a connection, comprising:

a channel that is arranged in a sensor holder, wherein the channel consists of one or more straight sections arranged perpendicular and/or parallel to a longitudinal axis of a sensor, wherein the connection is between the sensor holder and the sensor mounted on the sensor holder, wherein the leakage detector is designed to visualize a leakage of the sensor system by visual inspection at the channel, wherein the channel is configured to be closed or sealed at an open end of the channel by means of a closure apparatus, wherein the closure apparatus is a grub screw, and wherein the closure apparatus is configured to match the diameter of the channel, to close or seal the channel, and to prevent a blind hole of the sensor system for meeting compliance requirements in food industry.

11. The leakage detector according to claim 10, further comprising:

a plurality of straight sections arranged perpendicular to each other and connected to each other.

12. The leakage detector according to claim 10, wherein the leakage detector is arranged adjacent to an end of the sensor and is configured to indicate a leakage of the connection between the sensor holder and the sensor, and wherein the sensor has an end that is configured to permit mounting of a sensor system.

13. A sensor system for monitoring a sealing of a connection, comprising:

a sensor holder;

a sensor mounted on the sensor holder;

a closure apparatus; and a leakage detector including a channel that is arranged in the sensor holder, wherein the channel consists of one or more straight sections arranged perpendicular and/or parallel to a longitudinal axis of the sensor, wherein the connection is between the sensor holder and the sensor mounted on the sensor holder, wherein the leakage detector is designed to visualize a leakage of the sensor system by visual inspection at the channel, wherein, in the closure apparatus, a filter or a dye is integrated, and wherein the closure apparatus is arranged at an open end of the channel and configured to match the diameter of the channel, to close or seal the channel, and to prevent a blind hole of the sensor system for meeting compliance requirements in food industry.

* * * * *